great Britain

United States Patent Office 3,115,508
Patented Dec. 24, 1963

3,115,508
PRODUCTION of 17α-HYDROXY-20-KETO-16β-METHYL STEROID DERIVATIVES OF THE PREGNANE SERIES
Gordon Hanley Phillipps, Greenford, England, assignor to Glaxo Laboratories Limited, Greenford, England, a company of Great Britain
No Drawing. Filed July 26, 1962, Ser. No. 212,737
Claims priority, application Great Britain Aug. 2, 1961
11 Claims. (Cl. 260—397.45)

This invention is concerned with improvements in or relating to the preparation of steroid derivatives. More particularly, the invention is concerned with the reduction of 16-methylene steroids to the corresponding 16β-methyl steroids.

In United States Patent No. 3,040,069, there is described a process for the reduction of 17α-hydroxy-20-keto-16-methylene steroids by hydrogenation in the presence of a platinum hydrogenation catalyst or a Raney nickel catalyst, it having been found that by using such a catalyst a mixture of 16α- and 16β-methyl steroids was obtained in which, however, the 16β-methyl steroid preponderated. Whilst the 16β-methyl steroid preponderates in the mixture it is still generally necessary to use a purification step to eliminate the unwanted 16α-methyl steroid. In practice such a step has been found to be difficult to carry out and leads to further loss of yield of the desired compound.

It has now been found that if the hydrogenation of 17α-hydroxy-20-keto-16-methylene steroids, particularly 21-acyloxy-17α-hydroxy-20-keto-16-methylene steroids, is effected in the presence of an iridium catalyst the reaction is more stereospecific in favour of the desired 16β-methyl steroid as evidenced, for example, by optical rotation data and thin layer chromatography compared with the use of platinum or Raney nickel catalysts. Indeed in some cases such a high yield of 16β-methyl steroid may be obtained that the need for any purification step is eliminated for practical purposes. The increased stereospecificity of the process and the possible avoidance of the need to separate any 16α-methyl steroid enables one to obtain increased yields of the desired 16β-methyl steroid.

According to the invention, therefore, there is provided a process for the production of 17α-hydroxy-20-keto-16β-methyl steroids which comprises hydrogenating a 17α-hydroxy-20-keto-16-methylene steroid in the presence of an iridium catalyst.

The improved results which may be obtained using iridium are surprising, particularly in view of the fact that iridium has not been found generally to possess any striking merits as a hydrogenation catalyst.

The conditions under which the hydrogenation should be effected vary as between one solvent and another and one carrier and another. The optimum conditions should, therefore, be determined in a given case by preliminary trial. Generally, hydrogenation in ethanol or ethyl acetate has given superior results to other solvents but other solvents may be used including isopropanol. The use of ethyl acetate in particular enables high concentrations to be obtained. The iridium catalyst may consist of iridium metal (free from any support) or iridium metal deposited upon a suitable support. Barium sulphate was found to be a suitable support for the iridium catalyst but other suitable supports e.g. kieselguhr and calcium carbonate may be used, if desired. It is convenient to use a support which can later be dissolved to facilitate recovery of the iridium which is, of course, expensive. For this reason, calcium carbonate is especially suitable. Charcoal was not found to be a particularly suitable support for the hydrogenation of 21-desoxy compounds in that the process when conducted in the presence of this support resulted in D-homoannulation of the steroid.

The iridium catalyst may be prepared in the form of its dioxide, if desired deposited on a support. The iridium dioxide may then be subjected to a prereduction step or may be reduced in situ.

The hydrogenation is conveniently effected at atmospheric pressure and at ambient temperature. However, higher pressures and/or temperatures may be used if desired.

Where the hydrogenation product contains some 16α-methyl steroid, purification may be effected as desired, e.g. by repeated crystallisation.

Although 16β-methyl steroids can be obtained in high yield by hydrogenating 21-desoxy-17α-hydroxy-20-keto-16-methylene steroids according to the invention, we have found that even higher yields, i.e. greater stereospecificity, can be obtained by hydrogenating 21-acyloxy-17α-hydroxy-20-keto-16-methylene steroids using iridium as hydrogenation catalyst according to the invention with consequent advantages as described above.

According to a feature of the invention, therefore, the steroid which is hydrogenated in the presence of an iridium catalyst is a 21 - acyloxy - 17α - hydroxy - 20 - keto-16-methylene steroid.

For practical purposes it is normally convenient to use 21-acetoxy compounds as the 21-acyloxy compounds and this feature of the invention will be particularly described with reference to such compounds but is not limited thereto.

21 - acetoxy - 17α - hydroxy - 20 - keto - 16 - methylene steroids may be prepared by bromination of the corresponding 21-desoxy compound followed by acetolysis of the resultant 21-bromide.

By using a 21-acetoxy compound as starting material rather than a 21-desoxy compound it has been found to be possible to obtain very high yields of the desired 16β-methyl compound on hydrogenation. In some cases it may even be possible to obtain a theoretical yield.

The process according to the invention is believed to be generally applicable to pregnane steroids of the type specified. Such steroids may contain various other substituents including 3-acyloxy, 3-hydroxy or 3-keto groups; 11-acyloxy, 11-hydroxy, or 11-keto groups; 9,11-dichloro groups; 9(11)-dehydro unsaturation and the hydrogen atom, if any, in the 5-position may have the α- or β-configuration. It will be understood that some of these groups, such as 3-keto, may also be reduced during the hydrogenation. If it is desired to obtain 9α-halogeno-11β-hydroxy compounds ultimately, it is advantageous to use steroids of the general formula:

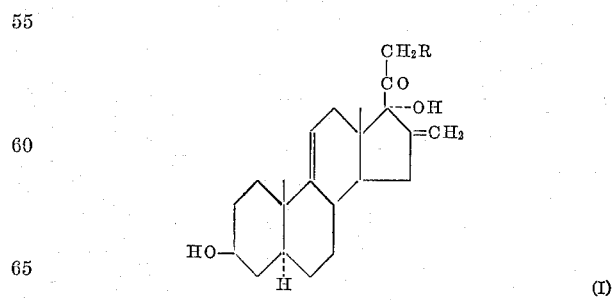

(I)

where R is a hydrogen atom or an acyloxy group. Compounds of general Formula I in which R is a hydrogen atom, may be obtained from hecogenin acetate as is described in United States Patent No. 3,040,069 to Phillipps et al. Compounds of general Formula I in which R is an acyloxy group may be obtained from compounds in which R is a hydrogen atom by bromination and acylolysis.

Compounds of general Formula I in which R is an acyloxy group are novel and are included within the scope of the invention.

Compounds of the above general formula may be hydrogenated according to the invention without, in general, loss of unsaturation at the 9(11)-positions to yield compounds of the general formula:

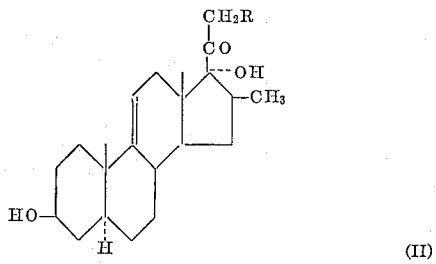

where R has the meaning defined above. Compounds of general Formula II in turn may be converted to anti-inflammatory steroids by one or other of the methods described in United States Patent No. 3,040,034 to Evans et al.

In order that the invention may be well understood the following examples, in which temperatures are expressed in degrees centigrade, are given by way of illustration only:

EXAMPLE 1

*Hydrogenation of 21 - Acetoxy - 3β,17α - Dihydroxy - 16 - Methylene-5α-Pregn-9-En-20-One Using 5% Iridium On Barium Sulphate as Catalyst and Ethanol as Solvent*

The catalyst (4.0 g.) was shaken for 25 min. in absolute ethanol (100 ml.) under hydrogen at atmospheric pressure and room temperature. The steroid (5.0 g.) and absolute ethanol (400 ml.) were then added and the suspension was shaken under hydrogen. The rate of uptake of hydrogen became negligible in 310 min. (total uptake 273 ml.) and the hydrogenation was then stopped. The catalyst was removed by filtration and washed with ethanol, and the combined filtrates were evaporated to dryness in vacuo. The crystalline residue was desolvated at 100°/0.1 mm. to give 21-acetoxy-3β,17α-dihydroxy-16β-methyl-5α-pregn-9-en-20-one (4.965 g., 99%), M.P. 189.5–194°, $[\alpha]_D$ +57.5° (c., 1.79 in $CHCl_3$).

The rotation of the product agreed with that of the pure 16β-methyl-compound $[\alpha]_D$ +57.5° ($CHCl_3$) and differed from that of the 16α-methyl-isomer $[\alpha]_D$ +23° ($CHCl_3$). Also, its infra red spectrum resembled that of the 16β-methyl-compound and thin-layer chromatography on alumina showed that it contained less than 2% of the 16α-methyl-isomer.

When the steroid (1.80 g.) in ethanol (200 ml.) was similarly hydrogenated using 5% platinum on barium sulphate (100 mg.) as catalyst the product (1.81 g.) had $[\alpha]_D$ +55.3° (c., 1.52 in $CHCl_3$), indicating that it contained 94% of the 16β-methyl compound. Crystallisation of part (1.70 g.) of the product from ethyl acetate (10 ml.) gave the 16β-methyl-compound (1.384 g., 81.5%), M.P. 194–198°, $[\alpha]_D$ +56.7° (c., 1.80 in $CHCl_3$), which from its rotation and from thin-layer chromatography contained ca. 2% of the 16α-isomer.

The starting material used in this example may be prepared as follows:

3β,17α-dihydroxy-16-methylene-5α-pregn-9-en-20-one (5.0 g.) in suspension in chloroform (100 ml.) was treated with 9.5 N hydrogen chloride in ethanol (11 ml.) to give a clear yellow solution. Bromine (1.02 mol.) in chloroform (23.5 ml.) was added dropwise over 25 min. to the stirred solution, when a pale brown solution was formed; during a further 10 min. the solution began to darken rapidly. A saturated aqueous solution of sodium hydrogen carbonate (ca. 150 ml.) was added until the aqueous phase became alkaline, the chloroform layer was washed with water, dried over magnesium sulphate and evaporated to dryness in vacuo to leave the crude bromo-compound as a brown froth (7.51 g.).

The froth (7.46 g.) and potassium acetate (22.0 g.) in acetone (200 ml.) were boiled under reflux with stirring for 2 hours. After being cooled, the mixture was treated with sufficient water to give a clear solution, and most of the acetone was distilled off under reduced pressure. Water (ca. 450 ml.) was added and the yellow solid (5.48 g.) was filtered off, washed with water and dried. The crude acetoxylated product (3.9 g.) was recrystallised twice from acetone to give an acetone solvent which, on desolvation at 110°/0.1 mm., gave 21-acetoxy-3β,17α-dihydroxy-16-methylene-5α-pregn-9 - en - 20 - one (1.902 g.), M.P. 193–196°. Further crystallisation from ethyl acetate gave the analytical sample as prisms (1.20 g.), M.P. 195.5–197.5°, $[\alpha]_D$ —21.3° (c., 1.03 in $CHCl_3$). (Found: C, 71.3; H, 8.6. $C_{24}H_{34}O_5$ requires C, 71.6; H, 8.5%.)

EXAMPLE 2

*Hydrogenation of 21 - Acetoxy - 3β,17α - Dihydroxy - 16-Methylene-5α-Pregn-9-En-20-One Using 5% Iridium on Barium Sulphate as Catalyst and Ethyl Acetate as Solvent*

The catalyst (600 mg.) was shaken for 43 min. in ethyl acetate (10 ml.) under hydrogen at atmospheric pressure and room temperature. The steroid (900 mg.) and ethyl acetate (20 ml.) were then added and the suspension was shaken under hydrogen. The rate of uptake of hydrogen became negligible in 190 min. (total uptake 58 ml.) and isolation as in Example 1 then gave the 16β-methyl-compound (867 mg.), M.P. 192–199.5°, $[\alpha]_D$ +56.7° (c., 1.71 in $CHCl_3$), which from its rotation and from thin-layer chromatography contained ca. 2% of the 16α-methyl-isomer.

When the steroid (900 mg.) in ethyl acetate (30 ml.) was similarly hydrogenated using 5% platinum on barium sulphate (100 mg.) as catalyst the product (892 mg.) had $[\alpha]_D$ +53.6° (c., 1.75 in $CHCl_3$), indicating that it contained ca. 89% of the 16β-methyl isomer.

EXAMPLE 3

*Hydrogenation of 21-Acetoxy-3β,17α-Dihydroxy-16-Methylene-5α-Pregn-9-En-20-One Using 5% Iridium on Barium Sulphate as Catalyst and Ethyl Acetate as Solvent at 40° C.*

Hydrogenation of the steriod (900 mg.) as in Example 2 but at 40° C. was complete in 155 min. and gave the 16β-methyl-compound (869 mg.), M.P. 189–194°, $[\alpha]_D$ +56.7° (c., 1.7 in $CHCl_3$), which from its rotation and from thin-layer chromatography contained ca. 2% of the 16α-methyl isomer.

EXAMPLE 4

*Hydrogenation of 21-Acetoxy-3β,17α-Dihydroxy-16-Methylene-5α-Pregn-9-En-20-One Using 5% Iridium on Kieselguhr as Catalyst and Ethanol as Solvent*

Hydrogenation of the steriod (900 mg.) in ethanol (100 ml.) using iridium on kieselguhr (600 mg.) as catalyst was complete in 22.5 hr. at room temperature and gave the 16β-methyl-compound (881 mg.), M.P. 184–188°, $[\alpha]_D$ +57.3° (c., 1.76 in $CHCl_3$), which from its rotation contained less than 1% of the 16α-methyl-compound.

EXAMPLE 5

*Hydrogenation of 3β,17α-Dihydroxy-16-Methylene-5α-Pregn-9-En-20-One Using 5% Iridium on Barium Sulphate as Catalyst and Ethanol as Solvent*

The steroid (1.0 g.) and pre-reduced catalyst (400 mg.) were shaken under hydrogen for 23.5 hr. in ethanol (100 ml.) to give a product (997 mg.), $[α]_D$ +35.3° (c., 1.57 in dioxan), which form its rotation contained ca. 90% of 3β,17α-dihydroxy-16β-methyl-5α-pregn-9-en-20-one (pure compound, $[α]_D$ +39°) and ca. 10% of the 16α-methyl isomer (pure compound, $[α]_D$ +2°).

EXAMPLE 6

*Hydrogenation of 3β,17α-Dihydroxy-16-Methylene-5α-Pregn-9-En-20-One Using Iridium Dioxide as Catalyst*

The steriod (1.0 g.) and pre-reduced iridium dioxide (40 mg.) were shaken under hydrogen for 22 hr. in ethanol (100 ml.) to give a product (963 mg.), $[α]_D$ +36.4° (c., 2.09 in dioxan), which from its rotation contained 93% of the 16β-methyl-compound.

When the steroid (1.0 g.) was similarly reduced but with Adams' platinum dioxide catalyst (12 mg.) the hydrogenation was complete in 160 min. and gave a product (1.00 g.), $[α]_D$ +33.8° (c., 2.28 in dioxan), which from its rotation contained ca. 86% of the 16β-methyl-compound.

EXAMPLE 7

*Hydrogenation of 21-Acetoxy-3β,17α-Dihydroxy-16-Methylene-5α-Pregn-9-En-20-One Using 7.5% Iridium on Calcium Carbonate as Catalyst and Ethyl Acetate as Solvent*

The steroid (120.7 g., 0.3 mole) was suspended in ethyl acetate (4.0 litres) and stirred at 31° to make a solution. Iridium on calcium carbonate catalyst (7.5% nominal; 18.0 g.) was added, washed in with ethyl acetate (20 ml.) and the mixture stirred vigorously at 31° under hydrogen. After 18 hr. the uptake of hydrogen had ceased at 7.5 litres (theory 7.32 litres at atmospheric conditions). After removal of the hydrogen the suspension was filtered and the catalyst washed with ethyl acetate (3 x 100 ml.). The cloudy filtrate was clarified by filtration through a kieselguhr pad and washed through with ethyl acetate. The filtrate was evaporated to dryness under reduced pressure at 85° for 30 mins. The product was slurried with acetone (1.0 litre) under reflux to give acetone solvated product (123.0 g.). A sample was dried at 100° in vacuo for 2.5 hrs., $[α]_D^{20}$ +56.7° (c., 1.8 in CHCl$_3$), M.P. 194–197°.

EXAMPLE 8

*Hydrogenation of 11β,21-Diacetoxy-3β,17α-Dihydroxy-16-Methylene-5α-Pregnan-20-One Using 7.5% Iridium on Calcium Carbonate as Catalyst and Ethyl Acetate as Solvent*

To a solution of the steroid (5 g.) in ethyl acetate (175 ml.) was added 7.5% iridium-on-calcium carbonate catalyst (0.75 g.). The air above the reaction mixture was replaced by nitrogen and then by hydrogen and the mixture agitated, under hydrogen, at 20° until the uptake of hydrogen ceased. The catalyst was filtered off, washed with a little ethyl acetate and the filtrate and washes were combined and concentrated to a slurry.

Light pertoleum (B.P. 100/120°) (20 ml.) was added and the mixture concentrated until all the ethyl acetate had been displaced. The residual slurry was cooled to room temperature and the 11β,21-diacetoxy-3β,17α-dihydroxy-16β-methyl-5α-pregnan-20-one was collected by filtration, washed with a little light petroleum and dried at 60°, in vacuo (4.95 g., 98.5%), M.P. 213–215°, $[α]_D^{20}$ +97.7° (dioxan).

The starting material was prepared from 3β,11β-diacetoxy-5α-pregn-16-ene-20-one (cf. Callow and James, JCS, 1956, 4739) by the steps of reaction with diazomethane, pyrolysis to form a 16-methyl-16(17)-ene compound, epoxidation, rearrangement with acid to a 17α-hydroxy-16-methylene-compound, bromination to a 21-bromide and reaction with potassium acetate to the 21-acetate.

EXAMPLE 9

*Hydrogenation of 21-Acetoxy-3β,17α-Dihydroxy-16-Methylene-5α-Pregn-9-En-20-One Using 7½% Iridium on Calcium Carbonate as Catalyst and Ethyl Acetate as Solvent*

Hydrogenation of the steroid (900 mg.) in ethyl acetate (30 ml.) using 7½% iridium on calcium carbonate (100 mg.) as catalyst was complete in 24 hr. at room temperature and gave the 16β-methyl compound (897 mg.), M.P. 195–199°, $[α]_D$ + 57.3; its rotation and thin-layer chromatography indicated that it contained <2% of the 16α-methyl-compound.

When the steroid (900 mg.) was similarly hydrogenated using 7½% platinum on barium sulphate (400 mg.) as catalyst the product (902 mg.) had $[α]_D$ +52.7° (in CHCl$_3$), indicating that it contained ca. 86% of the 16β-methyl isomer.

EXAMPLE 10

*Hydrogenation of 21-Acetoxy-3β,17α-Dihydroxy-16-Methylene-5α-Pregn-9-En-20-One Using 5% Iridium on Barium Sulphate as Catalyst and Ethyl Acetate as Solvent at Elevated Pressure*

Hydrogenation of the steroid (900 mg.) in ethyl acetate (30 ml.) using 5% iridium on barium sulphate (600 mg.) as catalyst at room temperature and at 4.2 atmospheres pressure (falling to 2.5 atmospheres in 22 hr.) gave the 16β-methyl compound (881 mg.), M.P. 190–197°, $[α]_D$ +56.4°; thin-layer chromatography indicated that it contained less than 2% of the 16α-methyl-compound.

EXAMPLE 11

*Hydrogenation of 3β-Acetoxy-17α-Hydroxy-16-Methylene-5α-Pregn-9-En-20-One Using 7½% Iridium on Calcium Carbonate as Catalyst and Ethanol as Solvent*

Hydrogenation of the steroid (1.0 g.) in ethanol (90 ml.) using 7½% iridium on calcium carbonate (600 mg.) as catalyst was complete in 270 min. and gave a product (998 mg.), $[α]_D$ +30.9° (in dioxan); its rotation indicated that it contained ca. 90% of the 16β-methyl-compound (pure compound, $[α]_D$ +34°) and ca. 10% of the 16α-methyl-compound (pure compound, $[α]_D$ +4°).

I claim:

1. A process for the production of 17α-hydroxy-20-keto-16β-methyl steroids of the pregnane series which comprises hydrogenating a 17α-hydroxy-20-keto-16-methylene steroid of the pregnane series in the presence of an iridium catalyst.

2. A process as defined in claim 1 in which the iridium is unsupported.

3. A process as defined in claim 1 in which the iridium is supported on a material selected from the group consisting of barium sulphate, kieselguhr and calcium carbonate.

4. A process as defined in claim 1 in which the iridium is formed by reduction in situ of iridium dioxide.

5. A process as defined in claim 1 in which the 17α-hydroxy-20-keto-16-methylene steroid is dissolved in a solvent selected from the group consisting of ethanol and ethyl acetate.

6. A process as defined in claim 1 in which the 17α-hydroxy-20-ketone-16-methylene steroid is a 21-desoxy steroid.

7. A process as defined in claim 1 in which the 17α-hydroxy-20-ketone-16-methylene steroid is a 21-acyloxy steroid.

8. A process as defined in claim 7 in which the 21-acyloxy steroid is a 21-acetoxy steroid.

9. A process as defined in claim 1 in which the 17α-hydroxy-20-keto-16-methylene steroid used has the formula:

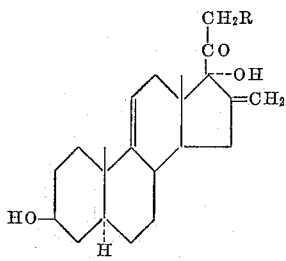

where R is selected from the group consisting of hydrogen and acyloxy groups.

10. A compound of the formula:

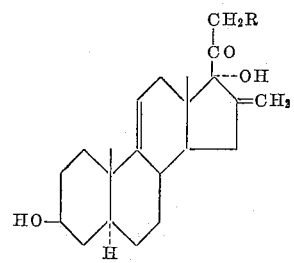

where R is an acyloxy group derived from a lower carboxylic acid.

11. 21 - acetoxy - 3β,17α - dihydroxy - 16 - methylene-5α-pregn-9-en-20-one.

No references cited.